US012498292B2

(12) United States Patent
Saeki

(10) Patent No.: US 12,498,292 B2
(45) Date of Patent: Dec. 16, 2025

(54) METHOD OF ASSEMBLING OPTICAL MODULE

(71) Applicant: SUMITOMO ELECTRIC INDUSTRIES, LTD., Osaka (JP)

(72) Inventor: Tomoya Saeki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 245 days.

(21) Appl. No.: 18/354,720

(22) Filed: Jul. 19, 2023

(65) Prior Publication Data

US 2024/0068904 A1    Feb. 29, 2024

(30) Foreign Application Priority Data

Aug. 30, 2022   (JP) ................................. 2022-136781

(51) Int. Cl.
| | | |
|---|---|---|
| *G01M 11/02* | (2006.01) | |
| *G01M 11/00* | (2006.01) | |
| *G02B 6/42* | (2006.01) | |
| *G02B 27/62* | (2006.01) | |
| *G02F 1/21* | (2006.01) | |

(52) U.S. Cl.
CPC ...... *G01M 11/0221* (2013.01); *G01M 11/333* (2013.01); *G02B 6/4206* (2013.01); *G02B 6/4227* (2013.01); *G02B 6/4246* (2013.01); *G02B 6/4286* (2013.01); *G02B 27/62* (2013.01); *G02F 1/212* (2021.01)

(58) Field of Classification Search
CPC ........ G02F 1/212; G02F 1/225; G02F 1/2255; G02F 1/2257; G02F 1/0102; G02F 1/025; G02F 1/015; G02F 2201/58; G02B 6/4214; G02B 6/4225; G02B 6/4227; G02B 6/4206; G02B 6/4246; G02B 6/4286; G02B 27/62; G01M 11/0221; G01M 11/333

See application file for complete search history.

(56) References Cited

U.S. PATENT DOCUMENTS

| | | | | |
|---|---|---|---|---|
| 2015/0078761 A1* | 3/2015 | Yamaji | ................. | H04B 10/501 |
| | | | | 398/182 |
| 2017/0227724 A1* | 8/2017 | Yamaji | ................. | H04B 10/505 |
| 2021/0055623 A1* | 2/2021 | Saeki | ..................... | G02F 1/025 |

FOREIGN PATENT DOCUMENTS

| | | |
|---|---|---|
| JP | 2021-509483 A | 3/2021 |
| WO | 2019/131804 A1 | 7/2019 |

* cited by examiner

*Primary Examiner* — Michelle R Connelly

(74) *Attorney, Agent, or Firm* — MCDONALD HOPKINS LLC

(57) ABSTRACT

A method of assembling an optical module according to the present disclosure includes disposing an input lens system at a position facing an input port, sensing a light intensity of divided light rays, adjusting the input lens system, and optically coupling the input lens system to the input port, and disposing a first output lens system and a second output lens system at positions facing a first output port and a second output port, respectively, and optically coupling the first output lens system and the second output lens system to the first output port and the second output port, respectively.

6 Claims, 11 Drawing Sheets

METHOD OF ASSEMBLING OPTICAL MODULE

CROSS REFERENCE TO RELATED APPLICATIONS

This application claims priority based on Japanese Patent Application No. 2022-136781 filed on Aug. 30, 2022, and the entire contents of the Japanese patent application are incorporated herein by reference.

TECHNICAL FIELD

The present disclosure relates to a method of assembling an optical module.

BACKGROUND

PTL 1 describes an optical module and its method of assembling. The optical module includes a housing, an input assembly and an output assembly attached to a side wall of the housing, and a semiconductor modulator disposed inside the housing. The semiconductor modulator includes an input port, a first output port, a second output port, a dividing portion, a first multiplexing portion, a second multiplexing portion, a plurality of arm waveguides, a first monitor port, and a second monitor port.

The input port inputs continuous light from the input assembly. The dividing portion divides the continuous light input from the input port into eight arm waveguides. The first multiplexing portion multiplexes a part of the signal lights propagated through the four arm waveguides and provides the multiplexed signal light to the first output port as a first output light. The second multiplexing portion multiplexes the rest of the signal lights propagated through the other four arm waveguides and provides the multiplexed signal light to the second output port as a second output light.

The semiconductor modulator includes eight modulation electrodes, four parent phase adjustment electrodes, and eight child phase adjustment electrodes. The modulation electrode is provided on the arm waveguide and applies a modulated voltage signal to the arm waveguide to change the refractive index of light in the arm waveguide. Thus, the phase of the light of the arm waveguide is modulated.

The optical module includes an input lens system for optically coupling the input assembly and the input port of the semiconductor modulator to each other, and a first output lens system and a second output lens system for optically coupling the output assembly and the first output port and the second output port, respectively, of the semiconductor modulator to each other. Each of the first output lens system and the second output lens system has a front lens and a rear lens.

In the method of assembling the optical module, first, various optical components including a semiconductor modulator are disposed inside a housing, and an input lens system is aligned and disposed. After aligning and fixing the rear lens of each of the first output lens system and the second output lens system, the front lens is disposed, and the maximum values of the power of the test light from the first output lens system and the second output lens system are compared. Among the first output lens system and the second output lens system, the front lens having the larger maximum value of the power of the test light is aligned first, and then the front lens having the smaller maximum value of the power of the test light is aligned. Thereafter, the front lenses are fixed, and the input assembly and the output assembly are aligned and fixed to the housing.

PTL 1: Japanese Unexamined Patent Application Publication No. 2021-509483

SUMMARY

A method of assembling an optical module according to the present disclosure is a method of assembling an optical module including a semiconductor modulator, a housing, and an input assembly and an output assembly. The semiconductor modulator having a rectangular planar shape, and including an input port configured to receive continuous light, a first output port, a second output port, and two monitor ports. The semiconductor modulator is configured to phase-modulate divided light rays obtained by splitting the continuous light, convert one of the divided light rays into a modulation signal to generate first output light that is output from the first output port, and convert the other one of the divided light rays into a modulation signal to generate second output light that is output from the second output port. The respective monitor ports being configured to monitor the first output light and the second output light. The housing is configured to accommodate the semiconductor modulator therein. The input assembly and the output assembly are provided on one side wall of the housing to face one side surface of the semiconductor modulator. The method of assembling includes: disposing an input lens system at a position facing the input port; sensing a light intensity of the divided light rays, adjusting the input lens system, and optically coupling the input lens system to the input port; and disposing a first output lens system and a second output lens system at positions facing the first output port and the second output port, respectively, and optically coupling the first output lens system and the second output lens system to the first output port and the second output port, respectively.

DETAILED DESCRIPTION

Figure 1:
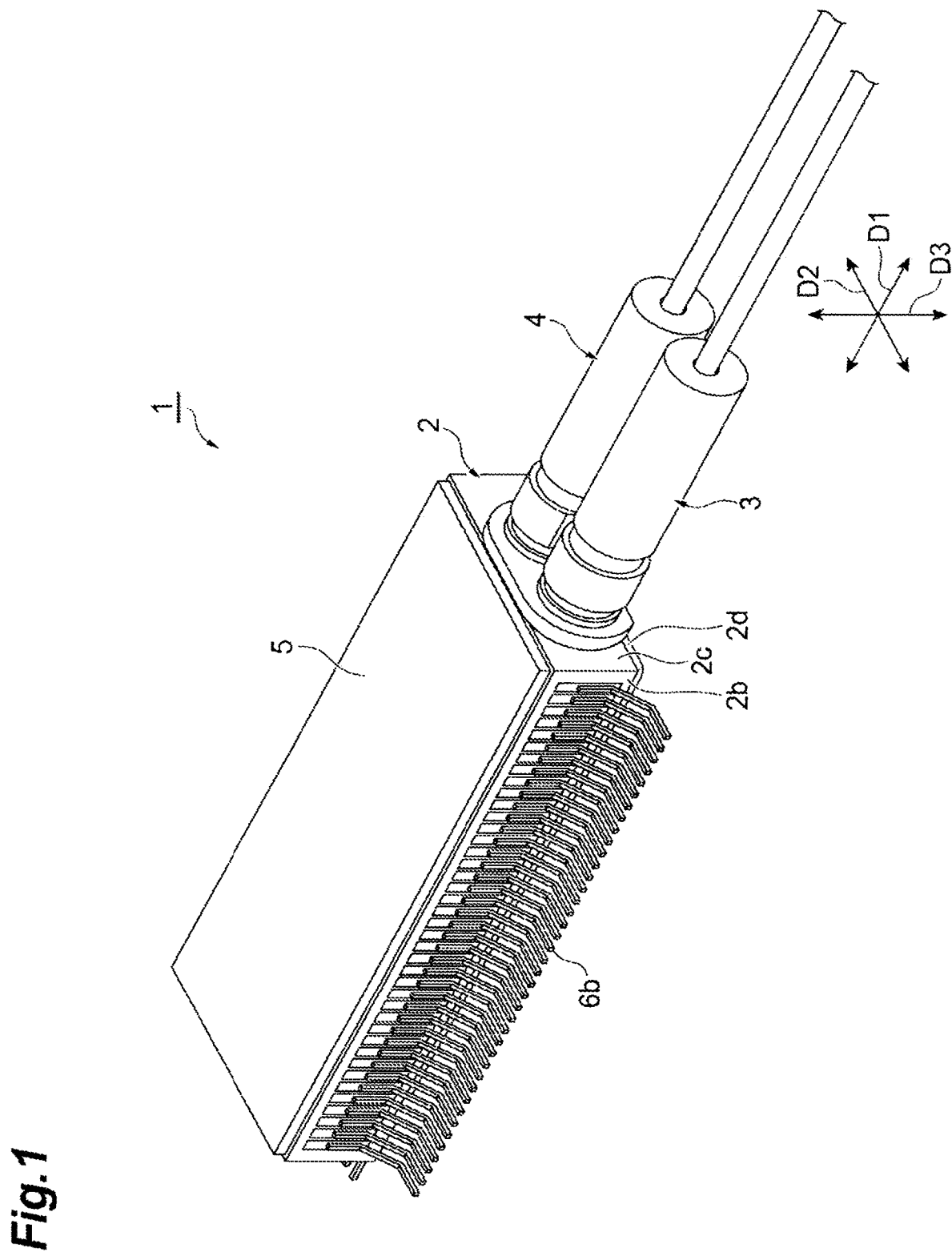
FIG. 1 is a perspective view of an optical module according to one embodiment.

In aligning the input port and the input lens system, a photocurrent of a monitor photo diode (PD) disposed on an optical path of a monitor port of the semiconductor modulator may be used. However, stray light other than the light passing through the optical path may be coupled to the monitor PD, and in this case, highly accurate aligning may not be performed. That is, since the amount of light to the monitor PD may decrease due to optical loss in the optical waveguide from the input to the output and optical coupling loss from the monitor port to the monitor PD, it may be difficult to perform aligning with high accuracy.

It is an object of the present disclosure to provide a method of assembling an optical module that can increase the accuracy of aligning.

DESCRIPTION OF EMBODIMENTS OF PRESENT DISCLOSURE

First, the contents of embodiments of a method of assembling an optical module according to the present disclosure will be listed and described.

(1) A method of assembling an optical module according to the embodiment is a method of assembling an optical module including a semiconductor modulator, a housing, and an input assembly and an output assembly. The semiconductor modulator having a rectangular planar shape, and including an input port configured to receive continuous light, a first output port, a second output port, and two monitor ports. The semiconductor modulator is configured to phase-modulate divided light rays obtained by splitting the continuous light, convert one of the divided light rays into a modulation signal to generate first output light that is output from the first output port, and convert the other one of the divided light rays into a modulation signal to generate second output light that is output from the second output port. The respective monitor ports being configured to monitor the first output light and the second output light. The housing is configured to accommodate the semiconductor modulator therein. The input assembly and the output assembly are provided on one side wall of the housing to face one side surface of the semiconductor modulator. The method of assembling includes: disposing an input lens system at a position facing the input port; sensing a light intensity of the divided light rays, adjusting the input lens system, and optically coupling the input lens system to the input port; and disposing a first output lens system and a second output lens system at positions facing the first output port and the second output port, respectively, and optically coupling the first output lens system and the second output lens system to the first output port and the second output port, respectively.

In this method of assembling an optical module, an input lens system is disposed at a position facing an input port of a semiconductor modulator. In the semiconductor modulator, the light intensity of the divided light ray is sensed, and the input lens system is optically coupled to the input port according to the sensed light intensity. A first output lens system is disposed at a position facing a first output port of the semiconductor modulator, and a second output lens system is disposed at a position facing a second output port of the semiconductor modulator. A first output lens system and a second output lens system are optically coupled to the first output port and the second output port, respectively. Therefore, since the input lens system is optically coupled to the input port, and each of the first output lens system and the second output lens system is optically coupled to each of the first output port and the second output port, the accuracy of aligning can be improved.

(2) In the above (1), the semiconductor modulator may be a Mach-Zehnder optical modulator including optical waveguides configured to guide the divided light rays, and an electrode may be provided in each of the branched optical waveguides of the semiconductor modulator. The disposing the input lens system may include outputting test light to the input port via the input lens system, and applying a voltage to the electrode provided in any one of the optical waveguides of the semiconductor modulator to detect an intensity of the test light, and determining a position of the input lens system at which an intensity of light detected through light absorption of the optical waveguides is maximized.

(3) In the above (2), in the determining the position of the input lens system, a position at which an intensity of light detected through light absorption of the optical waveguides is maximized in a state in which the voltage applied to the electrode of the semiconductor modulator is kept constant may be set as a position of the input lens system.

(4) In the above (3), the method of assembling may further include before the step of disposing the input lens system, disposing a simulation fiber configured to output the test light to the input port of the semiconductor modulator without the input lens system interposed.

(5) In the above (4), the method of assembling may further include after the disposing the simulation fiber, outputting test light to the input port; and applying a voltage to the electrode provided in any one of the optical waveguides of the semiconductor modulator to detect an intensity of the test light, and determining a position of the simulation fiber at which an intensity of light detected through light absorption of the optical waveguides is maximized.

(6) In the above (1), the method of assembling may further include before the disposing the input lens system, disposing monitor light-receiving elements to face the monitor ports of the semiconductor modulator. The disposing the input lens system may include outputting test light to the input port via the input lens system. An intensity of the test light may be detected by one of the monitor light-receiving elements via one of the monitor ports facing the monitor light-receiving elements. A position of the input lens system at which an intensity of light detected by the monitor light-receiving element is maximized may be determined.

(7) In the above (1), the method of assembling may include after the disposing the input lens system, fixing the input lens system to the housing using an ultraviolet curable resin.

DETAILS OF EMBODIMENTS OF PRESENT DISCLOSURE

A specific example of a method of assembling an optical module according to an embodiment of the present disclosure will be described below with reference to the drawings. It should be noted that the present invention is not limited to the following examples, and is intended to include all modifications within the scope of the claims and the equivalents thereof. In the description of the drawings, the same or corresponding elements are denoted by the same reference numerals, and redundant description is omitted as appropriate. The drawings may be partially simplified or exaggerated for ease of understanding, and dimensional ratios and the like are not limited to those illustrated in the drawings.

Figure 2:
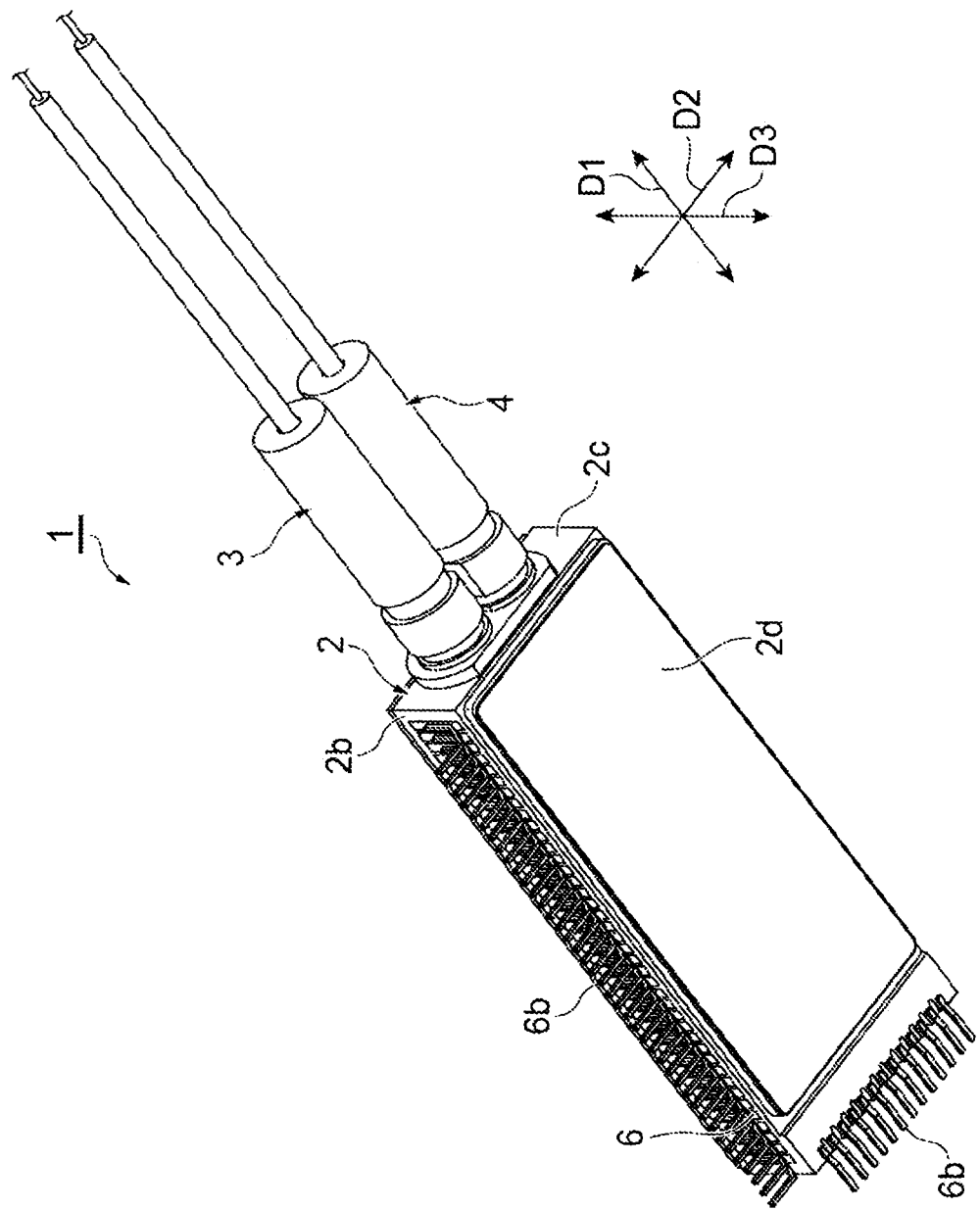
FIG. 2 is a perspective view of the optical module of FIG. 1 viewed from a direction different from that of FIG. 1.

FIG. 1 is a perspective view of an optical module 1 as an example. FIG. 2 is a perspective view of optical module 1 viewed from a direction different from that of FIG. 1. As shown in FIGS. 1 and 2, optical module 1 includes a rectangular parallelepiped housing 2, and an input assembly 3 and an output assembly 4 extending from housing 2. Each of input assembly 3 and output assembly 4 has a cylindrical shape. Housing 2 includes a pair of first side walls 2b extending along a first direction D1, a pair of second side walls 2c extending along a second direction D2 intersecting first direction D1, and a bottom wall 2d on which each component of optical module 1 is mounted. First direction D1 is the longitudinal direction of optical module 1, and second direction D2 is the width direction of optical module 1.

First side wall 2b extends in both first direction D1 and a third direction D3. Third direction D3 is a direction intersecting both first direction D1 and second direction D2, and corresponds to the height direction of optical module 1. The pair of second side walls 2c are arranged along first direction D1, and each second side wall 2c extends in both second direction D2 and third direction D3. Bottom wall 2d extends in both first direction D1 and second direction D2 at one end in third direction D3 of first side wall 2b and second side wall 2c.

Figure 3:
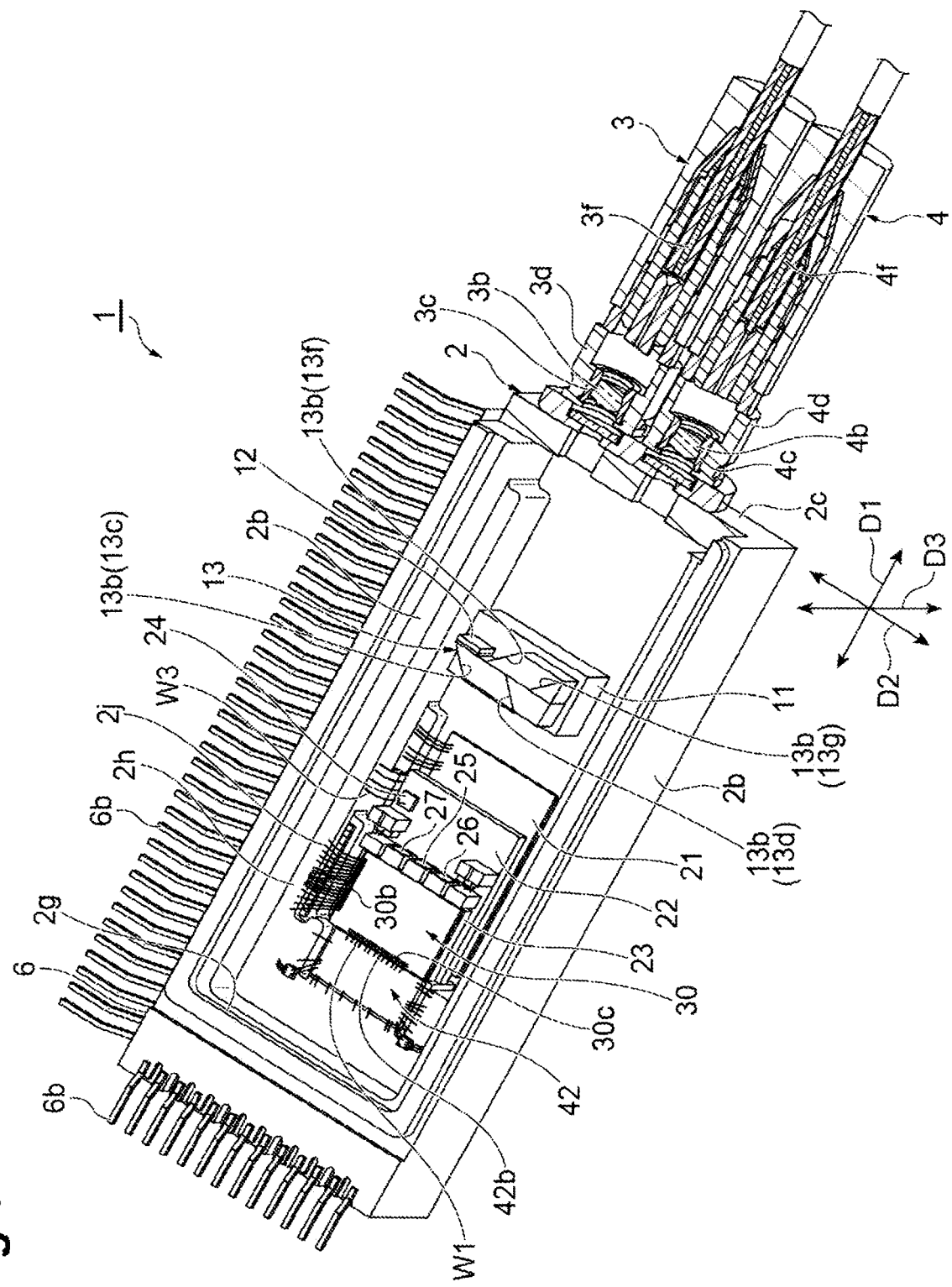
FIG. 3 is a perspective view showing the internal structure of the optical module of FIG. 1.
Figure 4:
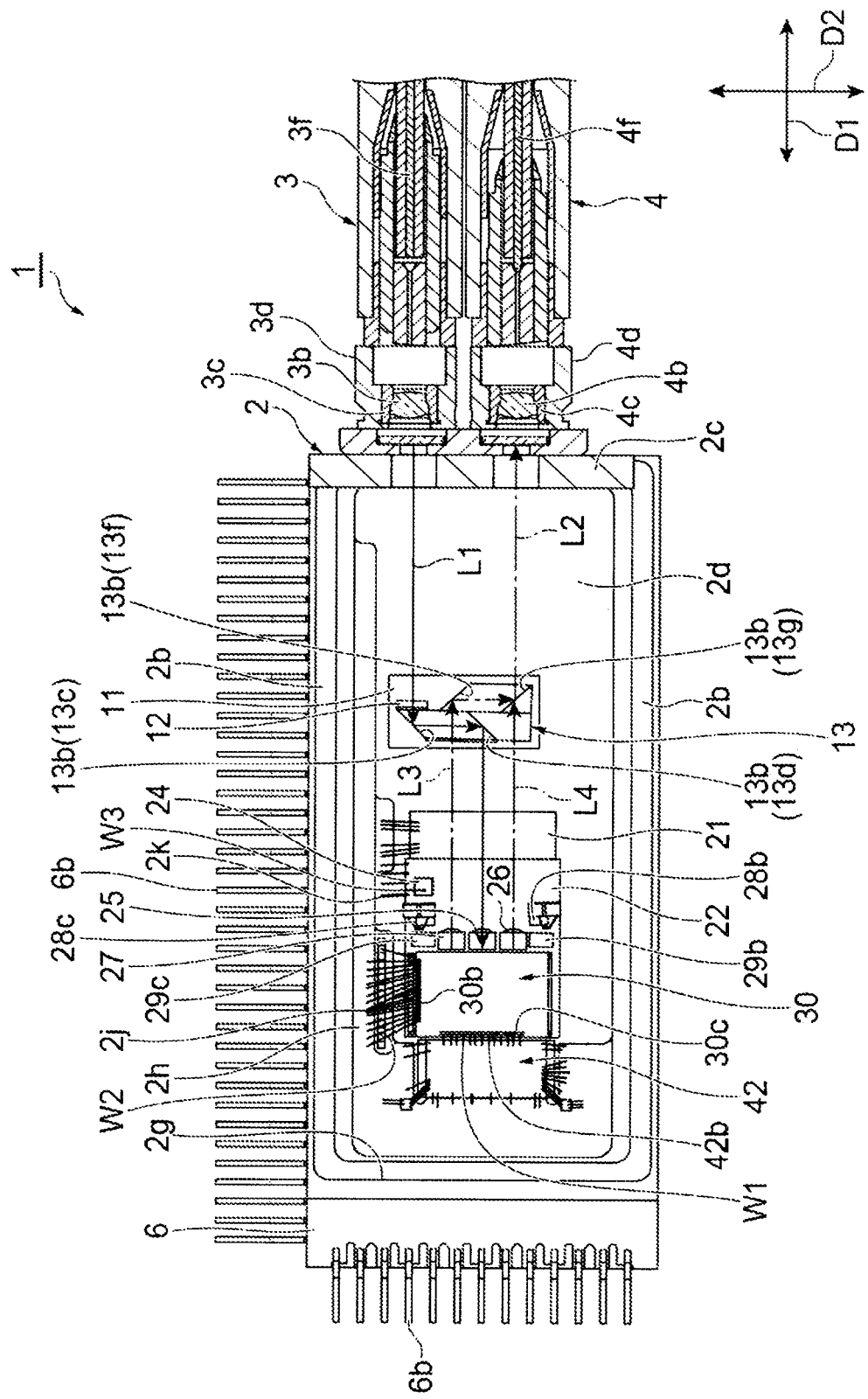
FIG. 4 is a plan view showing the internal structure of the optical module of FIG. 1.
Figure 5:
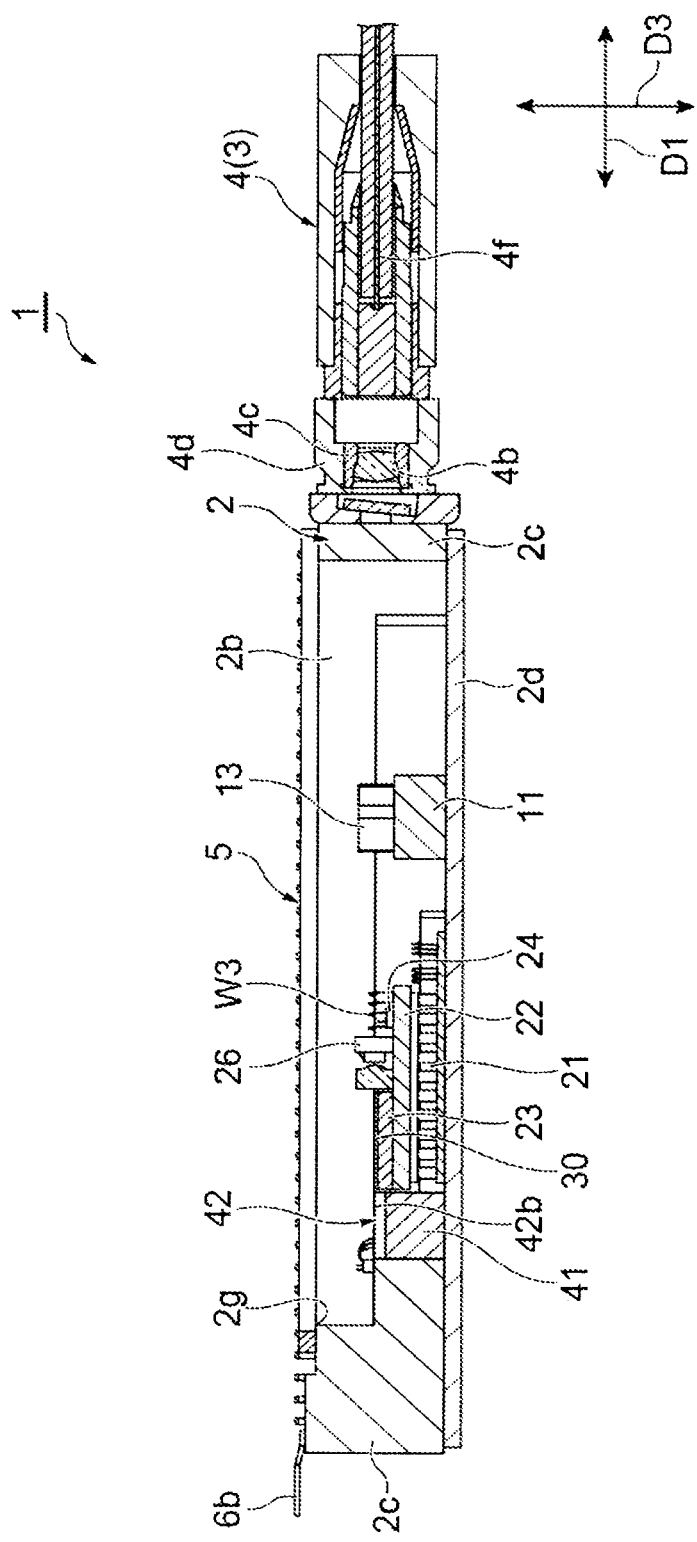
FIG. 5 is a cross-sectional side view of the optical module of FIG. 1.

FIG. 3 is a perspective view showing the internal structure of optical module 1. FIG. 4 is a plan view showing the internal structure of optical module 1. FIG. 5 is a longitudinal sectional view showing the internal structure of optical module 1.

As shown in FIGS. 3 to 5, the pair of first side walls 2b and the pair of second side walls 2c constitute an opening portion 2g of housing 2 having a frame shape when viewed from third direction D3. Optical module 1 includes a lid 5 that seals opening portion 2g. Lid 5 is made of metal. For example, in housing 2, a metal seal ring is joined to opening portion 2g, and lid 5 is joined to housing 2 via the seal ring. For example, lid 5 is joined to housing 2 by seam welding.

Input assembly 3 and output assembly 4 extend from one of the pair of second side walls 2c along first direction D1. Input assembly 3 and output assembly 4 are arranged along second direction D2. Input assembly 3 is a part for inputting an input light L1 from the outside of optical module 1 to the inside of optical module 1. Output assembly 4 is a part that outputs an output light L2 from the inside of optical module 1 to the outside of optical module 1.

Input assembly 3 is a pigtail component that holds an optical fiber 3f that is a polarization maintaining fiber (PMF). Input assembly 3 includes a lens 3b, a lens holder 3c that holds lens 3b, a sleeve 3d, and optical fiber 3f that is optically coupled to lens 3b. Input light L1 is emitted from optical fiber 3f, and input light L1 transmits through lens 3b and is input into optical module 1.

Output assembly 4 is a pigtail component that holds an optical fiber 4f that is a single mode fiber (SMF). Output assembly 4 includes a lens 4b, a lens holder 4c that holds lens 4b, a sleeve 4d, and optical fiber 4f that is optically coupled to lens 4b. Lens 4b condenses output light L2 from the inside of optical module 1 onto the tip surface of optical fiber 4f.

Optical module 1 has feedthroughs 6 provided in each of first side wall 2b and second side wall 2c. Feedthrough 6 has a plurality of lead pins 6b. The plurality of lead pins 6b are connected to, for example, a circuit board outside housing 2. The plurality of lead pins 6b include a lead pin for inputting an external signal to optical module 1, a lead pin for supplying a bias to an electric circuit inside housing 2, and a ground lead pin. In the embodiment of the present disclosure, the plurality of lead pins 6b are provided on each of first side wall 2b and second side wall 2c, but may be provided only on first side wall 2b.

Optical module 1 includes an optical base 11 mounted on bottom wall 2d and a composite optical component 13 including a filter 12 mounted on optical base 11. Filter 12 transmits input light L1 from input assembly 3. Filter 12 inputs input light L1 to composite optical component 13. Composite optical component 13 is disposed opposite to input assembly 3 with filter 12 between them. Composite optical component 13 has a plurality of reflection surfaces 13b for reflecting inputted input light L1.

The plurality of reflection surfaces 13b include a first reflection surface 13c, a second reflection surface 13d, a third reflection surface 13f, and a fourth reflection surface 13g. First reflection surface 13c and second reflection surface 13d are arranged along second direction D2. The position of third reflection surface 13f in second direction D2 is deviated from the position of first reflection surface 13c in second direction D2 and the position of second reflection surface 13d in second direction D2. The position of fourth reflection surface 13g in second direction D2 is deviated from the position of first reflection surface 13c in second direction D2 and the position of second reflection surface 13d in second direction D2. Third reflection surface 13f and fourth reflection surface 13g are arranged along second direction D2.

Input light L1 incident on composite optical component 13 along first direction D1 from filter 12 is reflected in second direction D2 at first reflection surface 13c. Input light L1 reflected at first reflection surface 13c is reflected at second reflection surface 13d in first direction D1 and is emitted to the side opposite to input assembly 3.

To composite optical component 13, an output light L3 and an output light L4, which will be described in detail later, are input along first direction D1 from the side opposite to output assembly 4. Output light L3 is reflected at third reflection surface 13f in second direction D2. Output light L3 reflected at third reflection surface 13f is reflected at fourth reflection surface 13g in first direction D1. Output light L4 is transmitted through fourth reflection surface 13g. Composite optical component 13 outputs output light L3 and output light L4 to the outside of optical module 1 as output light L2.

Optical module 1 includes a temperature control device 21 mounted on bottom wall 2d, a modulation element base 22 mounted on temperature control device 21, a modulation element carrier 23 mounted on modulation element base 22, and a modulator (semiconductor modulator) 30 mounted on modulation element carrier 23. Temperature control device 21 is a TEC (Thermo Electric Cooler). Furthermore, optical module 1 includes an input lens system 25, a first output lens system 26 and a second output lens system 27. Input lens system 25, first output lens system 26 and second output lens system 27 are mounted on modulation element base 22.

Modulator 30 is, for example, a multimode interferometer in which a Mach-Zehnder interferometer is formed on an indium phosphide (InP) substrate. Further, modulator 30 may be an element in which an optical waveguide is formed on a Si substrate. As an example, modulator 30 includes indium phosphide (InP), silicon dioxide ($SiO_2$), and benzocyclobutene (BCB). Modulator 30 will be described in detail later. Input lens system 25 is mounted between modulator 30 and composite optical component 13. First output lens system 26 and second output lens system 27 are respectively mounted on two sides of input lens system 25 in second direction D2.

Optical module 1 includes a heat sink 41 located opposite to composite optical component 13 with modulator 30 between them, and a driver IC 42 which is a driving circuit mounted on heat sink 41. Driver IC 42 includes an electrode pad 42b. Electrode pads 42b are arranged along second direction D2 at the end of driver IC 42 on the side of modulator 30. Optical module 1 has a wiring pattern 2j (see FIG. 3 or FIG. 4) provided on a frame body 2h of housing 2.

Wiring pattern 2j are arranged along first direction D1 on one side of second direction D2 of housing 2. Modulator 30 has an electrode pad 30c at a position facing driver IC 42, and electrode pads 30c are arranged along second direction D2. Optical module 1 includes a bonding wire W1 that electrically connects electrode pad 30c and electrode pad 42b to each other. Modulator 30 includes a control terminal 30b. Control terminals 30b are arranged along first direction D1 on one side of second direction D2 of modulator 30. Wiring pattern 2j is electrically connected to control terminal 30b of modulator 30 via a bonding wire W2. Optical module 1 includes a thermistor 24. Thermistor 24 is disposed, for example, between modulator 30 and composite optical component 13. Thermistor 24 is electrically connected to a pad 2k (see FIG. 4) provided on frame body 2h via a bonding wire W3.

Figure 6:
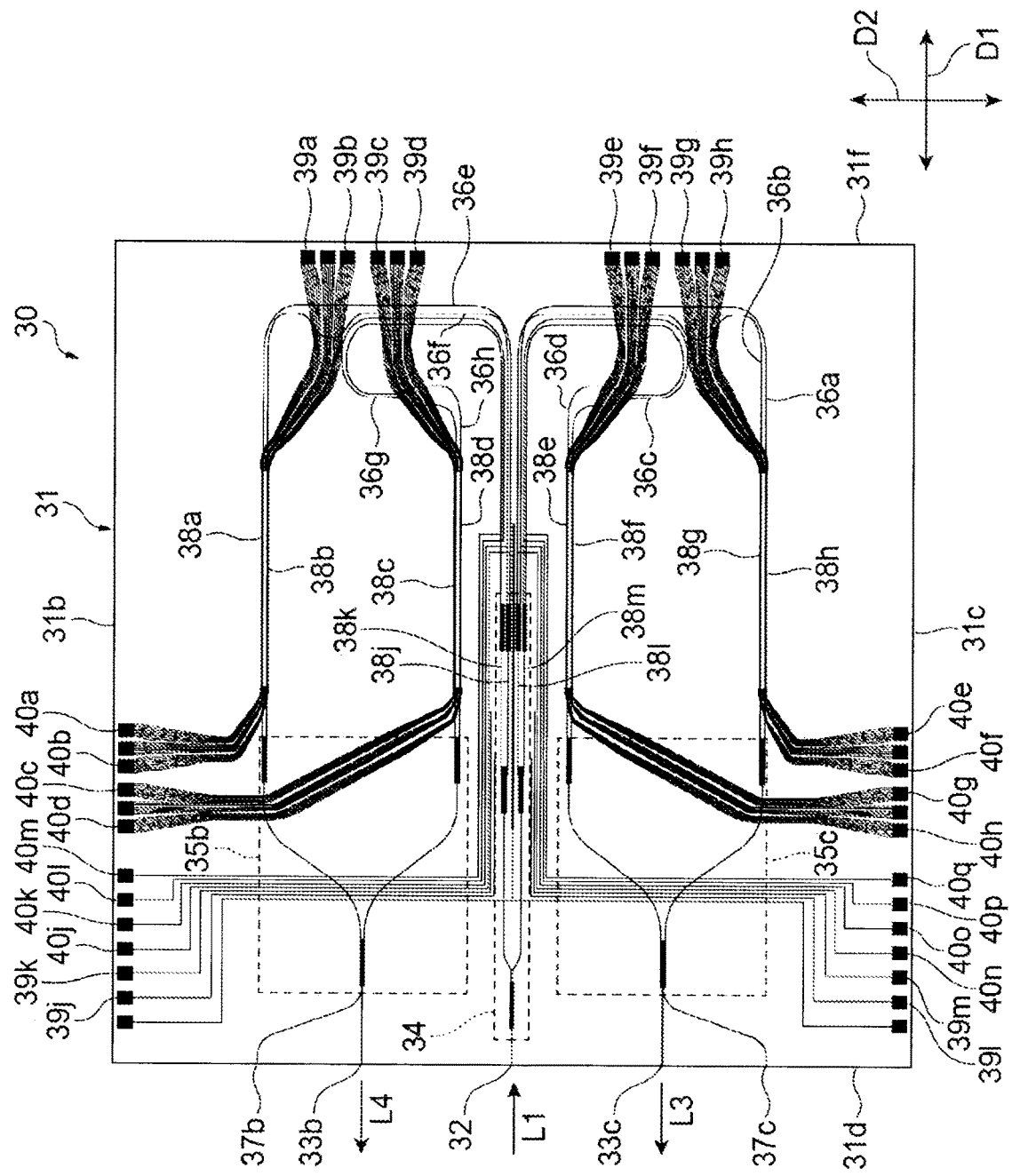
FIG. 6 shows a semiconductor modulator of the optical module of FIG. 1.

FIG. 6 is a plan view showing modulator 30. Modulator 30 is, for example, a multimode interferometer having a plurality of optical waveguides. As shown in FIGS. 4 and 6, modulator 30 includes, for example, a modulator chip 31, an input port 32, a first output port 33b, a second output port 33c, a dividing portion 34, a first multiplexing portion 35b, a second multiplexing portion 35c, optical waveguides 36a to 36h, a first monitor port 37b, and a second monitor port 37c.

The planar shape of modulator chip 31 is a rectangular shape. Modulator chip 31 has sides 31b and 31c extending in first direction D1 and sides 31d and 31f extending in second direction D2. Input port 32 is a light port through which input light L1 emitted from composite optical component 13 (second reflection surface 13d) is input into modulator 30 through input lens system 25. Input port 32 is located at side 31d. For example, input port 32 is located at the midpoint of side 31d. Driver IC 42 is disposed on side 31f side of modulator 30.

First output port 33b is a light port that outputs output light L4 that is the first polarization signal light to first output lens system 26, and second output port 33c is a light port that outputs output light L3 that is the second polarization signal light to second output lens system 27. Output light L4 output from first output port 33b is transmitted through first output lens system 26 and incident on composite optical component 13. Output light L3 output from second output port 33c is transmitted through second output lens system 27 and incident on composite optical component 13. First output port 33b and second output port 33c are provided on side 31d of modulator chip 31. First output port 33b and second output port 33c are disposed at symmetrical positions with each other with respect to input port 32.

Optical module 1 includes a first monitor PD (monitor light-receiving element) 28b and a second monitor PD (monitor light-receiving element) 28c. First monitor PD 28b receives the monitor signal light output from first monitor port 37b. First monitor PD 28b outputs a detection signal corresponding to the intensity of the received monitor signal light. This detection signal is output to the outside of optical module 1 from any one of the plurality of lead pins 6b electrically connected to first monitor PD 28b via a wire (not shown), for example. Second monitor PD 28c receives the monitor signal light output from second monitor port 37c. Second monitor PD 28c outputs a detection signal corresponding to the intensity of the received monitor signal light. This detection signal is output to the outside of optical module 1 from any one of the plurality of lead pins 6b electrically connected to second monitor PD 28c via a wire (not shown), for example.

Optical module 1 includes a first polarizer 29b located between first monitor PD 28b and first monitor port 37b, and a second polarizer 29c located between second monitor PD 28c and second monitor port 37c. First polarizer 29b receives the monitor signal light from first monitor port 37b. First polarizer 29b transmits only linearly polarized light (P-polarized light) of the monitor signal light. First monitor PD 28b receives only the linearly polarized light of the monitor signal light. Second polarizer 29c receives the monitor signal light from second monitor port 37c. Like first polarizer 29b, second polarizer 29c transmits only the linearly polarized light of the monitor signal light, and second monitor PD 28c receives only the linearly polarized light of the monitor signal light.

As shown in FIG. 6, dividing portion 34 divides input light L1 input from input port 32 to optical waveguides 36a to 36h. First multiplexing portion 35b multiplexes the signal light (a part of the signal light) propagated through optical waveguides 36e to 36h and provides the multiplexed signal light to first output port 33b as output light L4. Second multiplexing portion 35c multiplexes the signal lights (the rest of the plurality of signal lights) propagated through optical waveguides 36a to 36d, and provides the multiplexed signal light to second output port 33c as output light L3.

First monitor port 37b outputs the monitor signal light to first polarizer 29b. First monitor port 37b is a light port that relatively monitors the intensity of light output from first multiplexing portion 35b. Second monitor port 37c outputs the monitor signal light to second polarizer 29c. Second monitor port 37c is a light port that relatively monitors the intensity of light output from second multiplexing portion 35c. First monitor port 37b and second monitor port 37c are disposed at positions symmetrical with each other with respect to input port 32 on side 31d. Input port 32, first output port 33b, and second output port 33c are disposed between first monitor port 37b and second monitor port 37c (on the center side of modulator chip 31 in second direction D2).

Modulator 30 includes modulation electrodes (electrodes) 38a to 38h, parent phase adjustment electrodes 38j to 38m, and child phase adjustment electrodes (not shown). Modulation electrodes 38a to 38h are provided in optical waveguides 36a to 36h, respectively. Modulation electrodes 38a to 38h apply the modulated voltage signals to optical waveguides 36a to 36h to change the refractive indexes of the light passing through optical waveguides 36a to 36h. Thus, the phase of light propagating through optical waveguides 36a to 36h is modulated.

One end of each of modulation electrodes 38a to 38h is electrically connected to each of RF pads 39a to 39h for signal input via a wiring pattern. RF pads 39a to 39h for signal input are electrically connected to driver IC 42. The other end of each of modulation electrodes 38a to 38h is electrically connected to each of signal pads 40a to 40h for signal termination via a wiring pattern. Parent phase adjustment electrodes 38j to 38m are electrically connected to respective bias pads 39j to 39 in via the wiring pattern. The child-phase adjustment electrode is connected to each of bias pads 40j to 40q for adjusting signal input via a wiring pattern.

Figure 7:
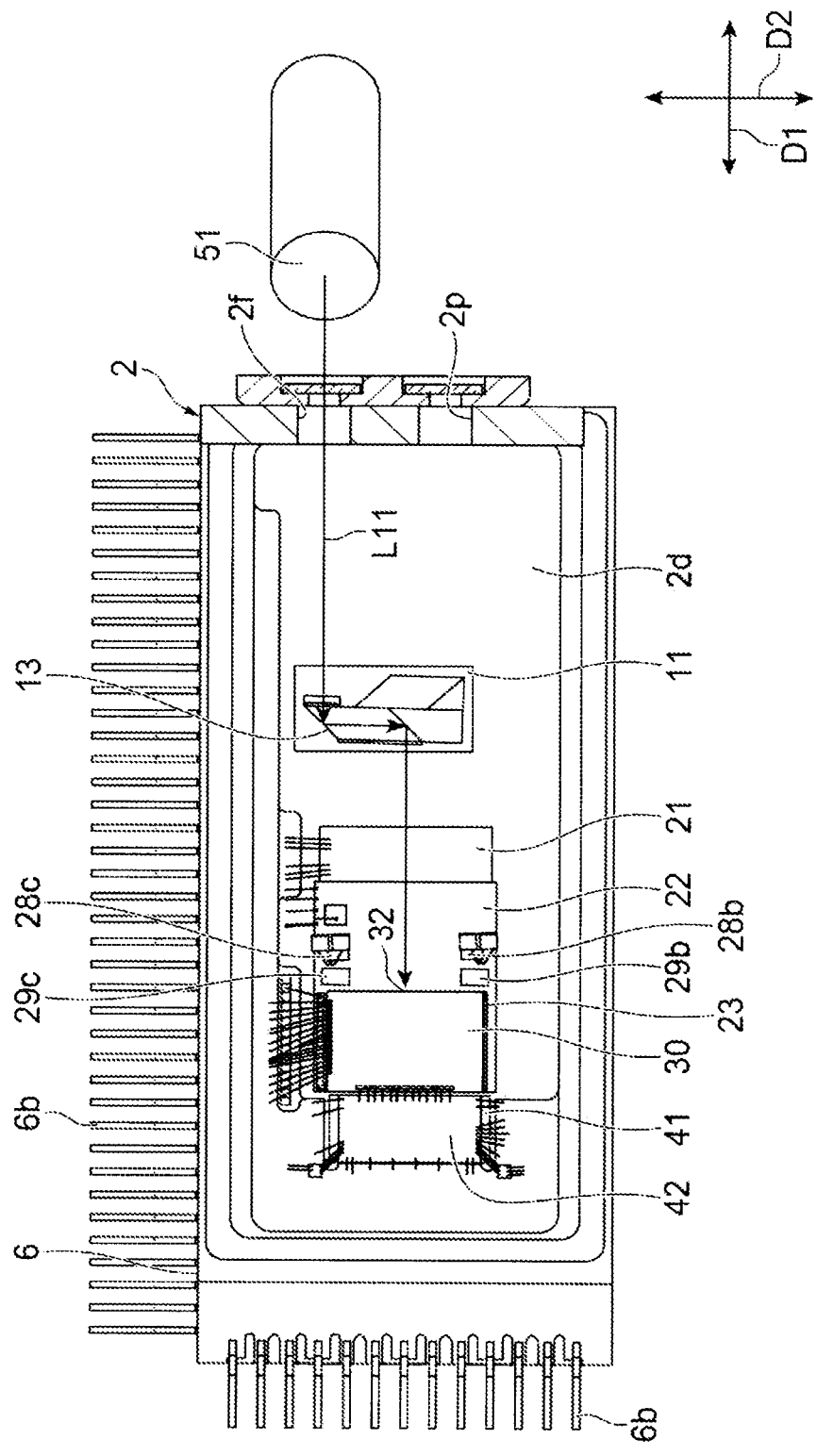
FIG. 7 shows one step of a method of assembling an optical module according to one embodiment.

Next, a specific example of the method of assembling optical module 1 according to the embodiment will be described with reference to FIGS. 7 to 11. First, as shown in FIG. 7, housing 2 having an input port 2f to which input assembly 3 is attached and an output port 2p to which output assembly 4 is attached is prepared. Temperature control device 21, modulation element base 22, modulation element carrier 23, and modulator 30 are mounted over bottom wall 2d of housing 2, and heat sink 41 and driver IC 42 are also mounted over bottom wall 2d of housing 2. Then, optical base 11 is mounted on bottom wall 2d, and composite optical component 13 is mounted on optical base 11. At this time, for example, as a countermeasure against reflected light, composite optical component 13 is fixed to optical base 11 by epoxy resin while being inclined at a predetermined angle (for example, 2°) with respect to first direction D1 (the optical axis of input light L1).

First polarizer 29b and second polarizer 29c are mounted on modulation element base 22. For example, first polarizer 29b and second polarizer 29c are mounted so as to be inclined at a predetermined angle with respect to first direction D1 as a countermeasure against reflected light. Subsequently, on modulation element base 22, first monitor PD 28b is mounted at a position facing first monitor port 37b, and second monitor PD 28c is mounted at a position facing second monitor port 37c (step of disposing a monitor light-receiving elements). At this time, as described above, first monitor PD 28b and second monitor PD 28c are mounted so as to be inclined at a predetermined angle with respect to first direction D1 as a countermeasure against reflected light.

Next, a simulation fiber 51 that outputs a test light L11 is disposed (step of disposing the simulation fiber). Simulation fiber 51 is, for example, a dummy collimated fiber and is held by a collimated fiber jig. At this time, simulation fiber 51 is disposed at a position facing input port 2f of housing 2. Then, test light L11 is output from simulation fiber 51 to input port 32 of modulator 30 disposed inside housing 2 (step of outputting test light).

Test light L11 input to input port 32 propagates through each of optical waveguides 36a to 36h (see FIG. 6). At this time, a voltage is applied to modulation electrodes 38a to 38h corresponding to any one of optical waveguides 36a to 36h to detect the intensity of test light L11. That is, a voltage is applied to modulation electrodes 38a to 38h while propagating test light L11 through optical waveguides 36a to 36h, and the absorption current in optical waveguides 36a to 36h is monitored. Then, the position of simulation fiber 51 is adjusted to the position at which the intensity of light (value of absorption current) detected by the light absorption of optical waveguides 36a to 36h becomes maximum (step of determining the position of the simulation fiber).

Figure 8:
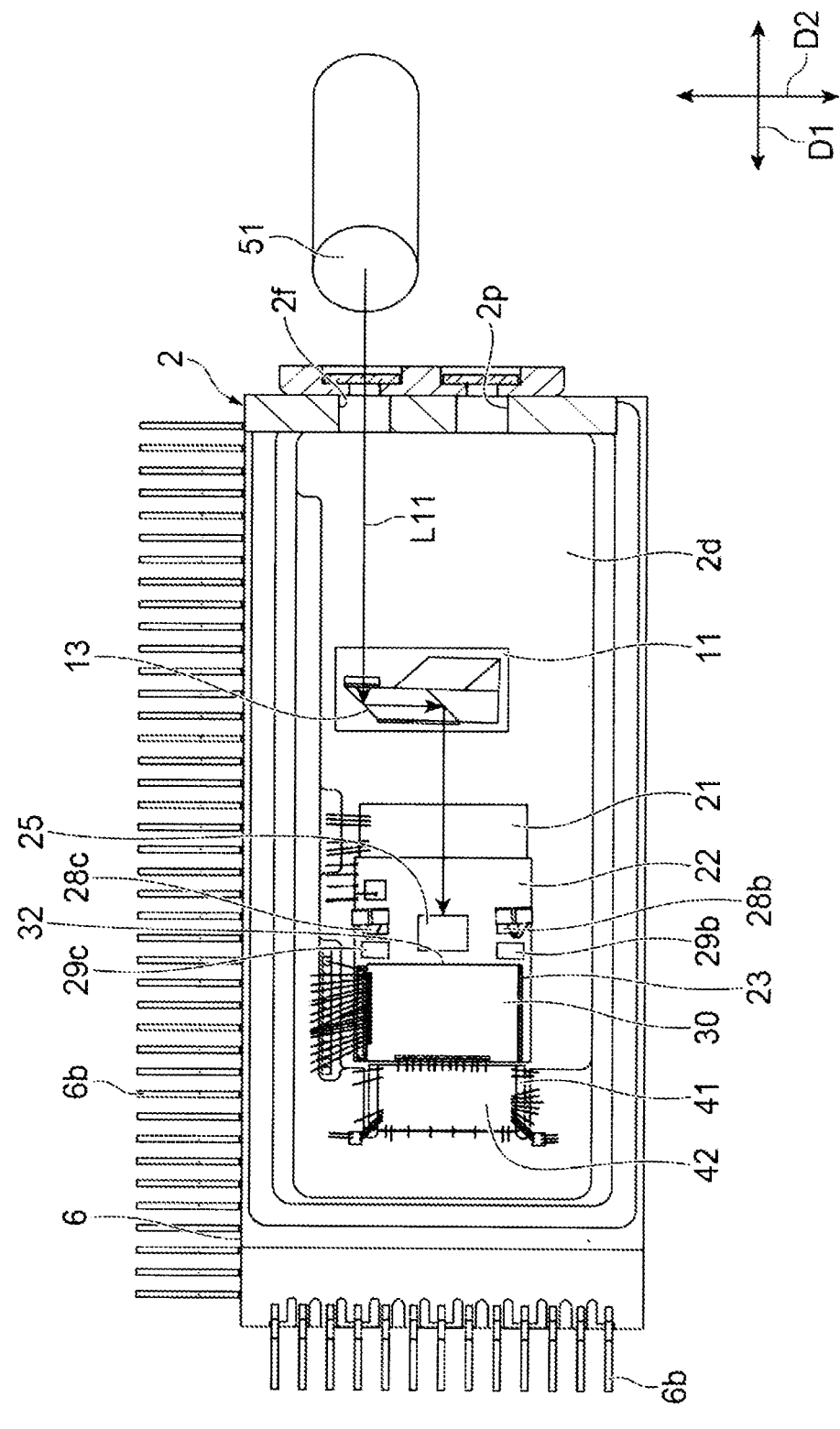
FIG. 8 shows one step of a method of assembling an optical module according to one embodiment.

Next, as shown in FIG. 8, input lens system 25 is disposed at a position facing input port 32 on modulation element base 22 (step of disposing the input lens system). Then, test light L11 is output from simulation fiber 51 to input port 32 (step of outputting test light to the input port). Thereafter, a voltage is applied to modulation electrodes 38a to 38h to detect the intensity of test light L11.

At this time, the light intensity of the light propagating through optical waveguides 36a to 36h, which are divided light rays, is detected, and input lens system 25 is adjusted to optically couple input lens system 25 to input port 32 (step of optically coupling). That is, the position of input lens system 25 is determined by aligning input lens system 25 at a position at which the intensity of light (value of absorption current) detected through light absorption of optical waveguides 36a to 36h is maximized (step of determining the position). At this time, a position at which the intensity of light detected through light absorption of optical waveguides 36a to 36h becomes maximum in a state where the voltage applied to modulation electrodes 38a to 38h is kept constant may be set as the position of input lens system 25. Then, input lens system 25 whose position has been determined is fixed to housing 2 (step of fixing the input lens system to the housing). Specifically, input lens system 25 is fixed via an ultraviolet curable resin coated on modulation element base 22.

Figure 9:
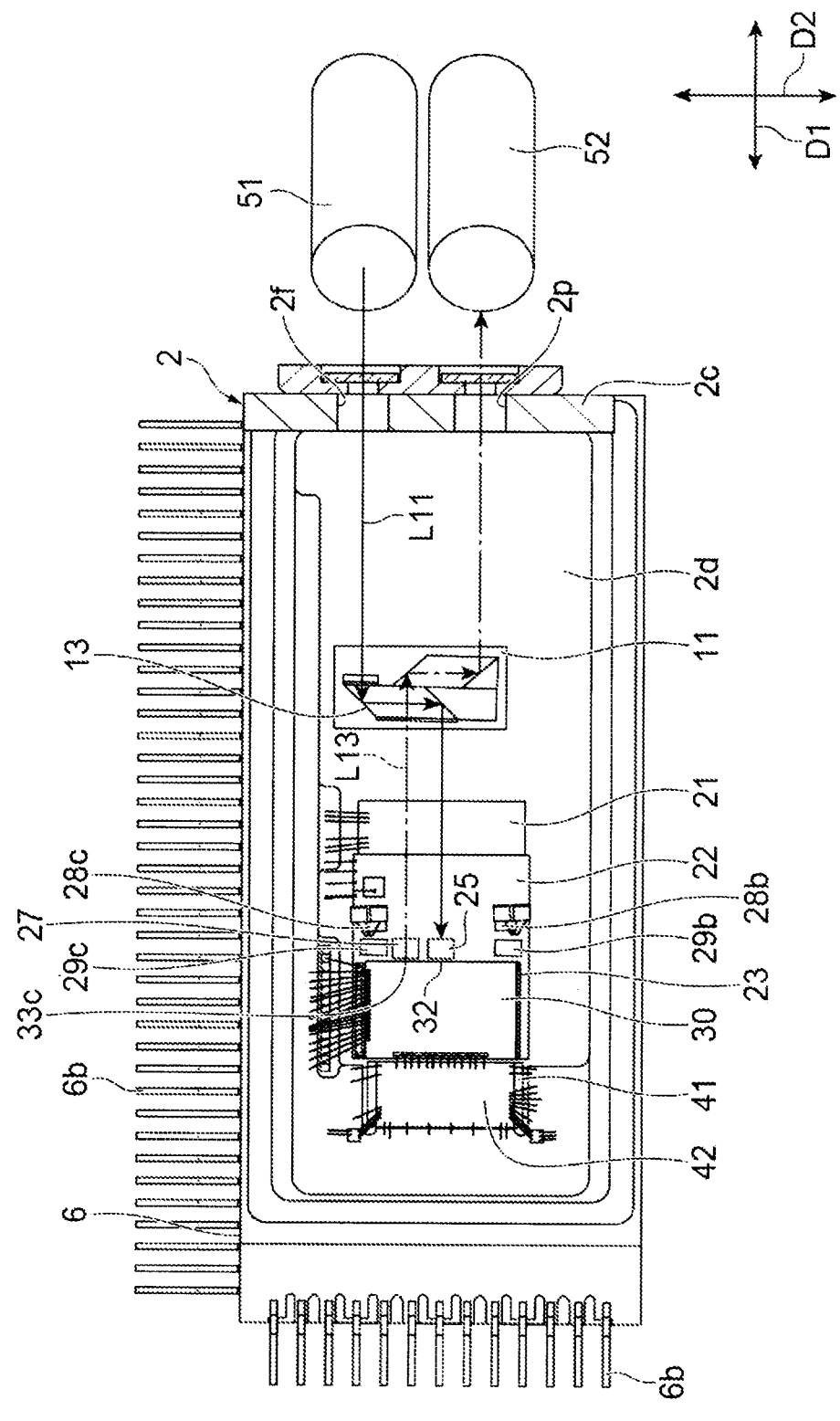
FIG. 9 shows one step of a method of assembling an optical module according to one embodiment.
Figure 10:
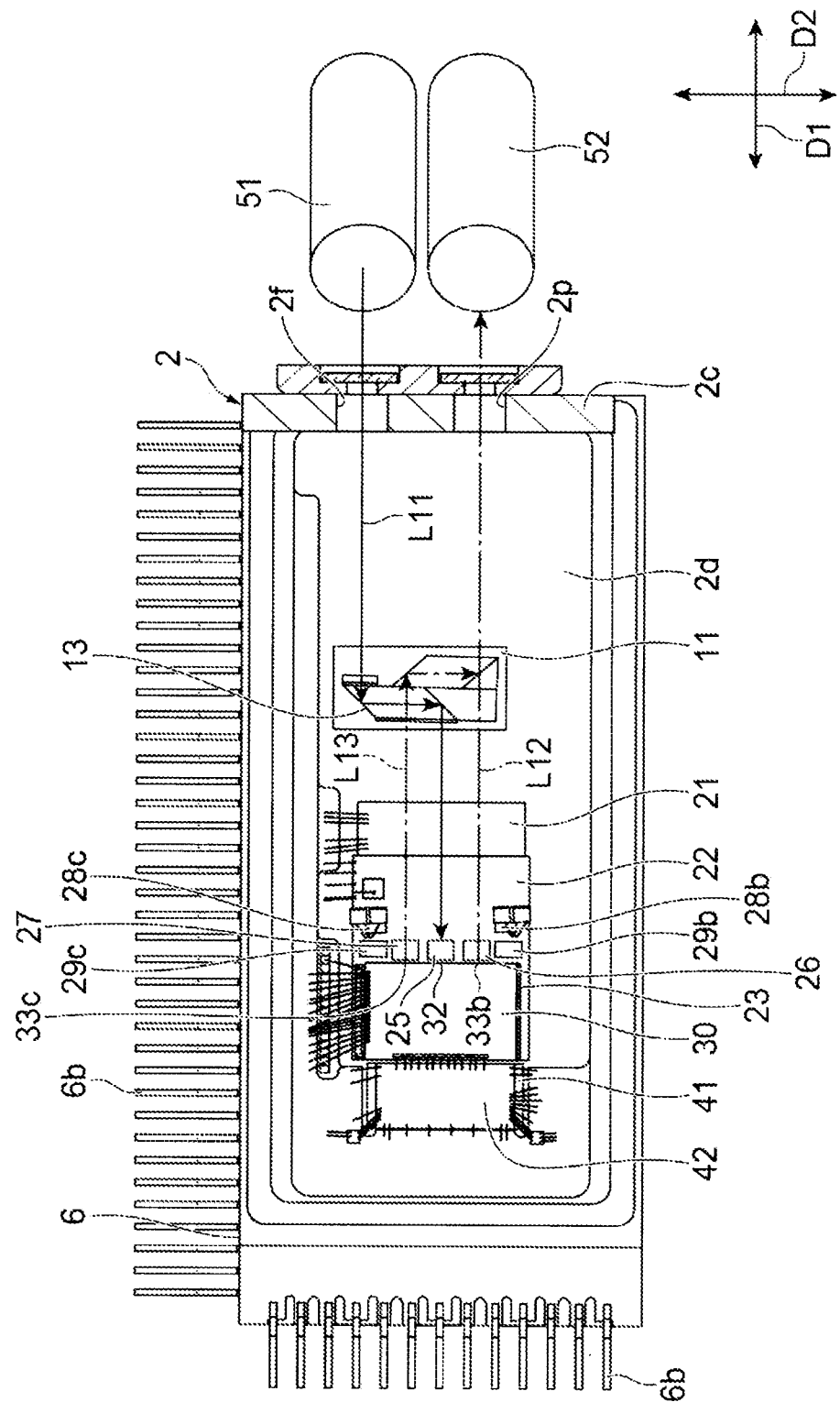
FIG. 10 shows one step of a method of assembling an optical module according to one embodiment.

As shown in FIGS. 9 and 10, first output lens system 26 and second output lens system 27 are disposed at positions facing first output port 33b and second output port 33c, respectively. Then, first output lens system 26 and second output lens system 27 are optically coupled to first output port 33b and second output port 33c, respectively (step of optically coupling).

To be specific, first, each of the phase adjustment terminals (each of parent phase adjustment electrodes 38j to 38m and the child phase adjustment electrodes) of modulator 30 is adjusted so as to have maximum light transmission. Next, a simulation fiber 52 is disposed at a position facing output port 2p of housing 2, and test light L11 is input from simulation fiber 51 to input port 32. Then, aligning of simulation fiber 52 is performed so that the test light output in response to the input of test light L11 to input port 32 is coupled.

Subsequently, second output lens system 27 is disposed at a position facing second output port 33c in modulation element base 22, and first output lens system 26 is disposed at a position facing first output port 33b in modulation element base 22. When test light L11 is input from simulation fiber 51 to input port 32, test light L12 is output from first output port 33b and test light L13 is output from second output port 33c. At this time, by adjusting the bias voltage to modulator 30, the output states of test light L12 and test light L13 are adjusted.

The maximum value of the fiber coupling power of test light L12 is compared with the maximum value of the fiber coupling power of test light L13. First, the bias voltage to modulator 30 is adjusted so that either test light L12 or test light L13 is output. The bias voltage is adjusted so that only test light L12 is output, and test light L12 passes through first output lens system 26 and is then input to simulation fiber 52. The position of first output lens system 26 is determined so that the fiber coupling power of test light L12 becomes maximum. On the other hand, the bias voltage is adjusted so that only test light L13 is output, and test light L13 passes through second output lens system 27 and is then input to simulation fiber 52. Then, the position of second output lens system 27 is determined so that the fiber coupling power of test light L13 becomes maximum.

In the step of optical coupling, the phase states of optical waveguides 36a to 36h of modulator 30 are adjusted so that the output intensities of test light L12 and test light L13 are maximized. One of first output lens system 26 and second output lens system 27, which is given a smaller fiber coupling power in simulation fiber 52, is fixed first. That is, one of first output lens system 26 and second output lens system 27 corresponding to the smaller one of the maximum value of the fiber coupling power of test light L12 and the maximum value of the fiber coupling power of test light L13 is first fixed to modulation element base 22. Thereafter, the other of first output lens system 26 and second output lens system 27, to which the larger fiber coupling power is given in simulation fiber 52, is shifted in the optical axis direction (first direction D1) so as to coincide with the fiber coupling power of the one, and is fixed to modulation element base 22. First output lens system 26 and second output lens system 27 are fixed to modulation element base 22 by an adhesive such as an ultraviolet curable resin (UV resin).

Figure 11:
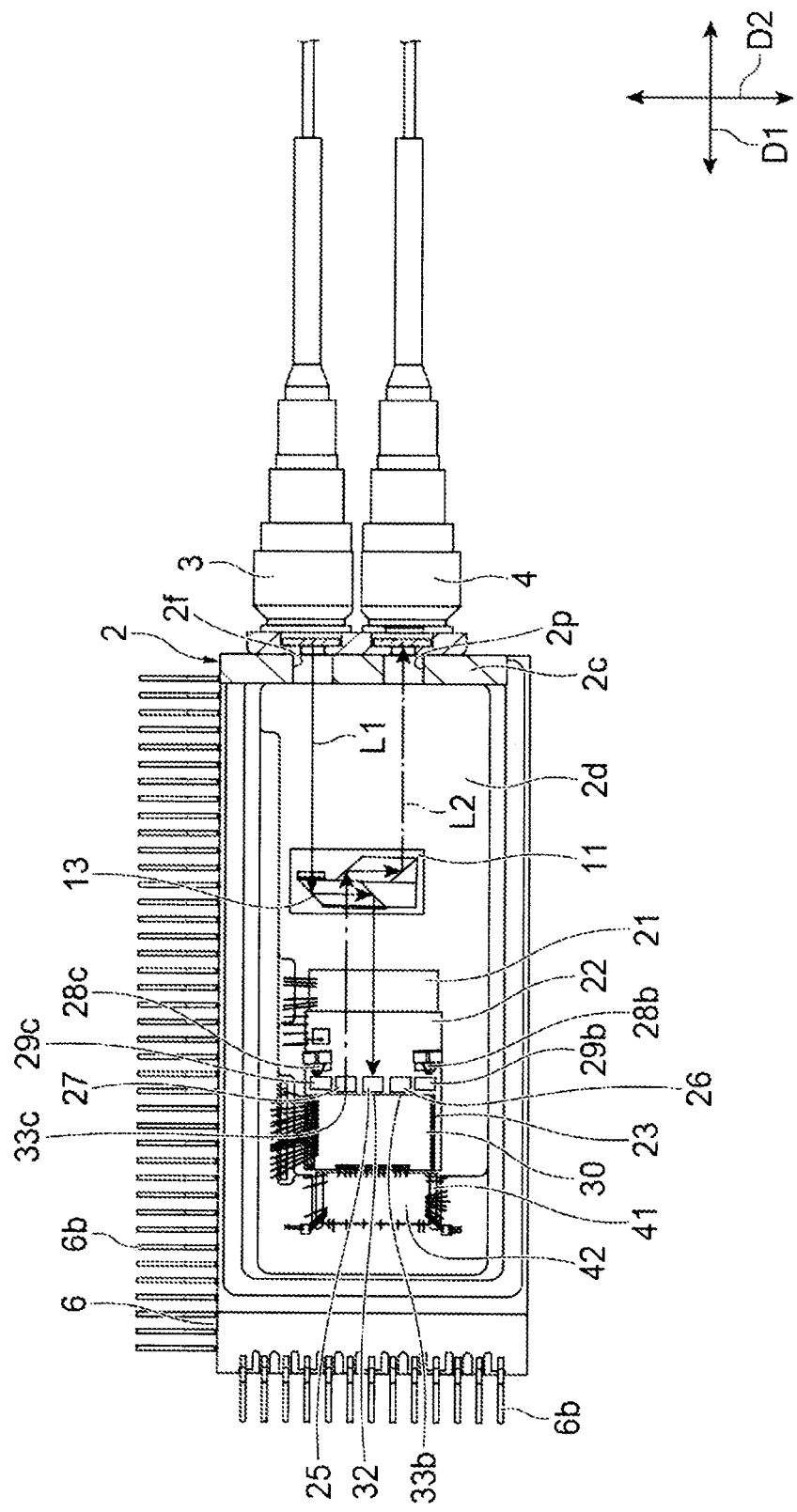
FIG. 11 shows one step of a method of assembling an optical module according to one embodiment.

Thereafter, as shown in FIGS. 10 and 11, simulation fiber 51 and simulation fiber 52 are replaced with input assembly 3 and output assembly 4. At this time, each of input assembly 3 and output assembly 4 is aligned and fixed using a YAG aligning welder. To be more specific, input light L1 is introduced from input assembly 3, and output light L2 passing through the one of first output lens system 26 and second output lens system 27 to which aligning has been performed in advance is output.

Next, three body aligning of housing 2, lenses 3b and 4b, and optical fibers 3f and 4f is performed. In detail, while sliding input assembly 3 and output assembly 4 on second side wall 2c of housing 2, the positions of input assembly 3 and output assembly 4 at which the light intensity of output light L2 is maximized are determined. At this time, the determined positions of input assembly 3 and output assembly 4 are equal to the positions of simulation fiber 51 and simulation fiber 52.

Then, input assembly 3 and output assembly 4 are fixed to second side wall 2c of housing 2 by YAG welding. At this time, input assembly 3 is fixed by setting its rotation angle around the optical axis to a predetermined angle. When output light L2 corresponding to the other of first output lens system 26 and second output lens system 27 to which aligning is performed later is input to output assembly 4, a light intensity equivalent to the light intensity detected when aligning of first output lens system 26 and second output lens system 27 is performed is obtained. At this time, the light intensities of the output lights output from first output port 33b and second output port 33c are equal to each other.

Next, the effects obtained from the method of assembling optical module 1 according to the embodiment of the present disclosure will be described. In the method of assembling optical module 1, input lens system 25 is disposed at a position facing input port 32 of modulator 30. In modulator 30, the light intensity of the light propagating through optical waveguides 36a to 36h, which are divided light rays, is sensed, and input lens system 25 is optically coupled to input port 32 according to the sensed light intensity. First output lens system 26 is disposed at a position facing first output port 33b of modulator 30, and second output lens system 27 is disposed at a position facing second output port 33c of modulator 30. Then, first output lens system 26 and second output lens system 27 are optically coupled to first output port 33b and second output port 33c, respectively. Therefore, since input lens system 25 is optically coupled to input port 32, and each of first output lens system 26 and second output lens system 27 is optically coupled to each of first output port 33b and second output port 33c, the accuracy of aligning can be improved.

In the embodiment of the present disclosure, modulator 30 may be a Mach-Zehnder optical modulator including optical waveguides 36a to 36h configured to guide the divided light rays, and modulation electrodes 38a to 38h may be provided in each of the branched optical waveguides 36a to 36h of modulator 30. A step of disposing input lens system 25 may include a step of outputting test light L11 to input port 32 via input lens system 25, and a step of applying a voltage to any one of modulation electrodes 38a to 38h of optical waveguides 36a to 36h of modulator 30 to detect the intensity of test light L11, and determining the position of input lens system 25 at which the intensity of light detected through light absorption of optical waveguides 36a to 36h is maximized.

By the way, the photocurrents of first monitor PD 28b and second monitor PD 28c disposed on the optical path of first monitor port 37b and the optical path of second monitor port 37c, respectively, may be used as monitors when aligning of input lens system 25 to input port 32 is performed. However, in this case, since stray light other than the light propagated through optical waveguides 36a to 36h may be coupled to first monitor PD 28b or second monitor PD 28c, there is a possibility that highly accurate aligning may not be performed. On the other hand, in the above-described embodiment, since the photocurrent when the voltage is applied to modulation electrodes 38a to 38h of optical waveguides 36a to 36h is used as the monitor at the time of aligning, the accuracy and speed of aligning can be improved. Further, when the absorption currents of a plurality of Mach-Zehnder are monitored, the photocurrents are added in accordance with the number of optical waveguides, and a large reference current can be obtained, so that the accuracy and speed of aligning can be further improved.

As described above, in the step of determining the position of input lens system 25, the position at which the intensity of light detected through light absorption of optical waveguides 36a to 36h is maximized in a state in which the voltage applied to the electrode of modulator 30 is kept constant may be set as the position of input lens system 25.

The method of assembling according to an embodiment may further include, before the step of disposing input lens system 25, a step of disposing simulation fiber 51 configured to output test light L11 to input port 32 of modulator 30 without input lens system 25 interposed.

The method of assembling according to an embodiment may include, after the step of disposing simulation fiber 51, a step of outputting test light L11 to input port 32, and a step of applying a voltage to modulation electrodes 38a to 38h provided in optical waveguides 36a to 36h of modulator 30 to detect the intensity of test light L11, and determining the position of simulation fiber 51 at which the intensity of light detected through light absorption of optical waveguides 36a to 36h is maximized.

The method of assembling according to an embodiment may further include, before the step of disposing input lens system 25, a step of disposing monitor PD 28b and 28c to face monitor ports 37b and 37c of modulator 30. The step of disposing input lens system 25 may include a step of outputting test light L11 to input port 32 via input lens system 25. An intensity of test light L12, L13 may be detected by one of monitor PD 28b, 28c via one of monitor ports 37b, 37c facing monitor PD 28b, 28c. A position of input lens system 25 at which the intensity of light detected by monitor PD 28b, 28c is maximized may be determined.

The method of assembling according to an embodiment may include, after the step of disposing input lens system 25, a step of fixing input lens system 25 to housing 2 using an ultraviolet curable resin.

Embodiments of the method of assembling an optical module according to the present disclosure have been described above. However, the present invention is not limited to the embodiments described above. That is, it is easily recognized by those skilled in the art that various modifications and changes can be made to the present invention without departing from the gist described in the claims. For example, the contents and order of the steps of the method of assembling the optical module are not limited to the contents described above and can be changed as appropriate. Furthermore, the shape, size, number, material, and arrangement of each component of the optical module are not limited to those described above and can be changed as appropriate.

What is claimed is:

1. A method of assembling an optical module, the optical module including
   a semiconductor modulator having a rectangular planar shape, and including an input port configured to receive continuous light, a first output port, a second output port, and two monitor ports, the semiconductor modulator being configured to phase-modulate divided light rays obtained by splitting the continuous light, convert one of the divided light rays into a modulation signal to generate first output light that is output from the first output port, and convert the other one of the divided light rays into a modulation signal to generate second output light that is output from the second output port, the respective monitor ports being configured to monitor the first output light and the second output light,
   a housing configured to accommodate the semiconductor modulator therein, and
   an input assembly and an output assembly provided on one side wall of the housing to face one side surface of the semiconductor modulator, the method comprising:
   disposing an input lens system at a position facing the input port;
   sensing a light intensity of the divided light rays, adjusting the input lens system, and optically coupling the input lens system to the input port; and
   disposing a first output lens system and a second output lens system at positions facing the first output port and the second output port, respectively, and optically coupling the first output lens system and the second output lens system to the first output port and the second output port, respectively, wherein the semiconductor modulator is a Mach-Zehnder optical modulator including optical waveguides configured to guide the divided light rays, and an electrode is provided in each of the optical waveguides of the semiconductor modulator, and
   wherein the disposing the input lens system includes
   outputting test light to the input port via the input lens system, and
   applying a voltage to the electrode provided in any one of the optical waveguides of the semiconductor modulator to detect an intensity of the test light, and determining a position of the input lens system at which an intensity of light detected through light absorption of the optical waveguides is maximized, and
   wherein the determining the position of the input lens system includes using a photocurrent, when the voltage is applied, as a monitor.

2. The method of assembling the optical module according to claim 1,
   wherein, in the determining the position of the input lens system, a position at which an intensity of light detected through light absorption of the optical waveguides is maximized in a state in which the voltage applied to the electrode of the semiconductor modulator is kept constant is set as a position of the input lens system.

3. The method of assembling the optical module according to claim 2, the method further comprising:
   before the disposing the input lens system, disposing a simulation fiber configured to output the test light to the input port of the semiconductor modulator without the input lens system interposed.

4. The method of assembling the optical module according to claim 3, the method comprising:
   after the disposing the simulation fiber, outputting test light to the input port; and applying a voltage to the electrode provided in any one of the optical waveguides of the semiconductor modulator to detect an intensity of the test light, and determining a position of the simulation fiber at which an intensity of light detected through light absorption of the optical waveguides is maximized.

5. The method of assembling the optical module according to claim 1, the method further comprising:
   before the disposing the input lens system, disposing monitor light-receiving elements to face the monitor ports of the semiconductor modulator,
   wherein the disposing the input lens system includes outputting test light to the input port via the input lens system,
   wherein an intensity of the test light is detected by one of the monitor light-receiving elements via one of the monitor ports facing the monitor light-receiving elements, and
   wherein a position of the input lens system at which an intensity of light detected by the monitor light-receiving element is maximized is determined.

6. The method of assembling the optical module according to claim 1, the method comprising:
   after the disposing the input lens system, fixing the input lens system to the housing using an ultraviolet curable resin.

* * * * *